Figure 3:
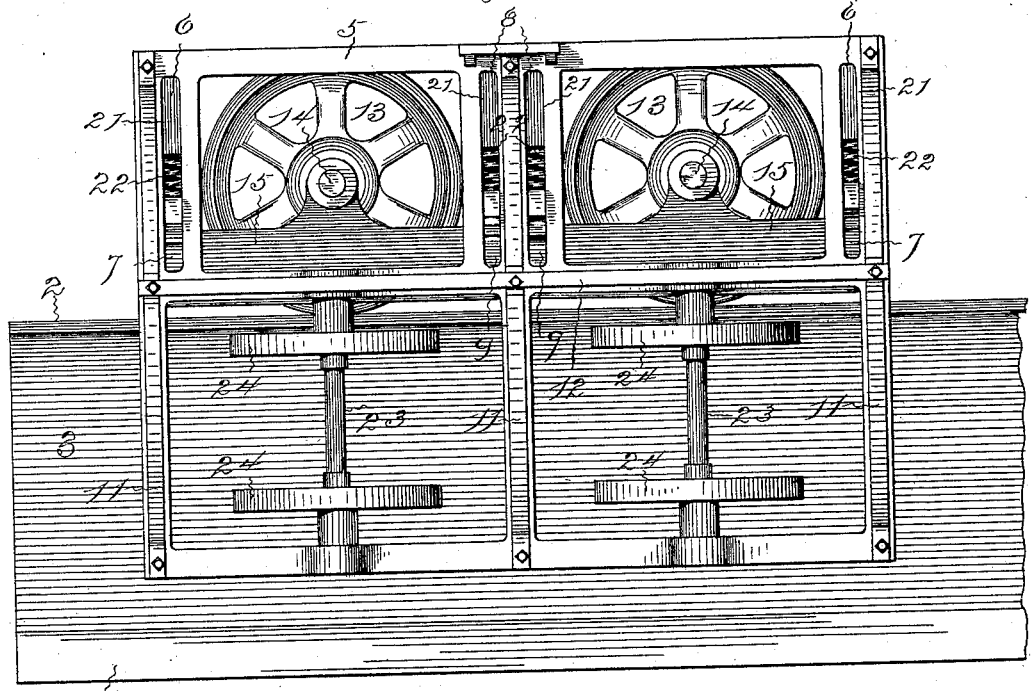

No. 609,781. Patented Aug. 30, 1898.
G. J. CAPEWELL.
CAR TRUCK.
(Application filed Nov. 13, 1895. Renewed Jan. 5, 1898.)
(No Model.) 3 Sheets—Sheet 1.
Fig. 1
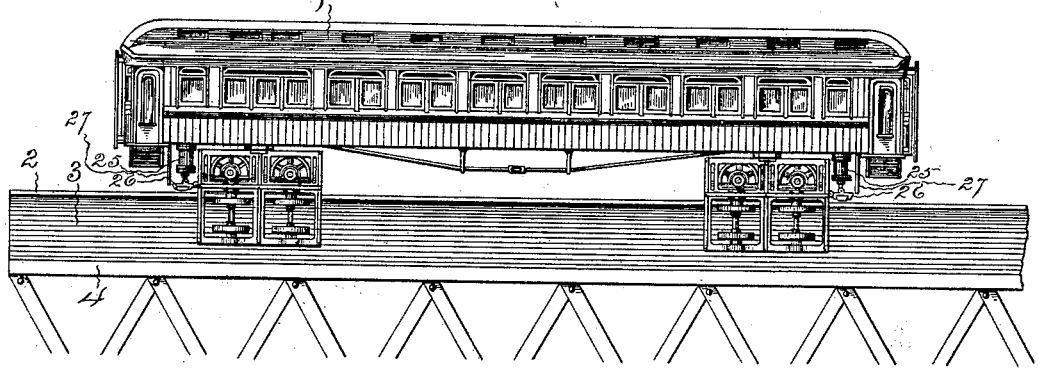
Fig. 2.
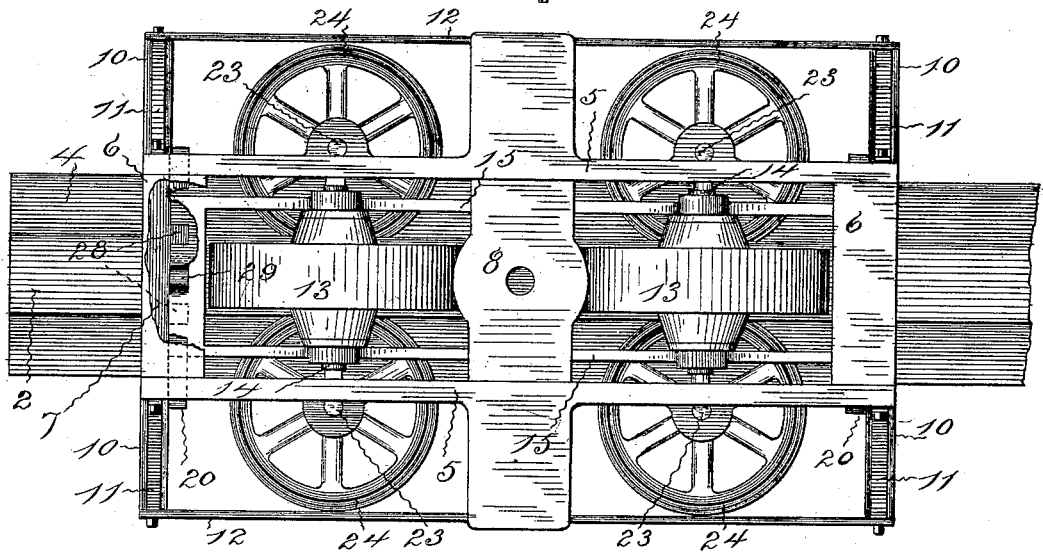
Fig. 7
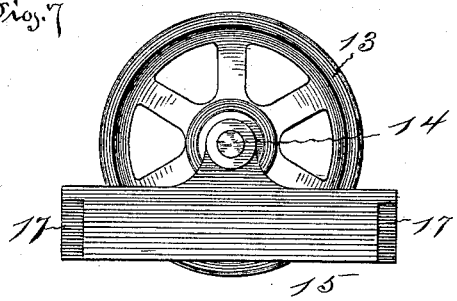
Fig. 8
Witnesses:
Andrew Ferguson
E. J. Hyde.
Inventor,
George J. Capewell, by
Harry P. Williams
Atty.

No. 609,781. Patented Aug. 30, 1898.
G. J. CAPEWELL.
CAR TRUCK.
(Application filed Nov. 13, 1895. Renewed Jan. 5, 1898.)

(No Model.) 3 Sheets—Sheet 2.

Witnesses:
Andrew Ferguson,
E. J. Hyde,

Inventor,
George J. Capewell, by
Harry R. Williams
atty.

No. 609,781. Patented Aug. 30, 1898.
G. J. CAPEWELL.
CAR TRUCK.
(Application filed Nov. 13, 1895. Renewed Jan. 5, 1898.)
(No Model.) 3 Sheets—Sheet 3.
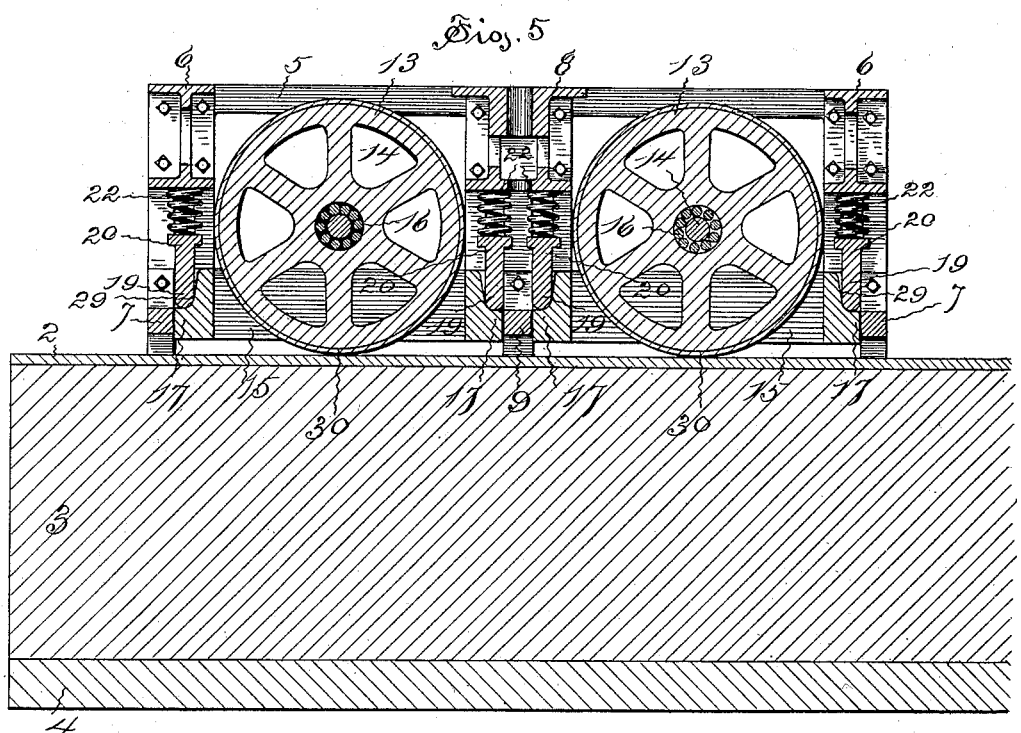
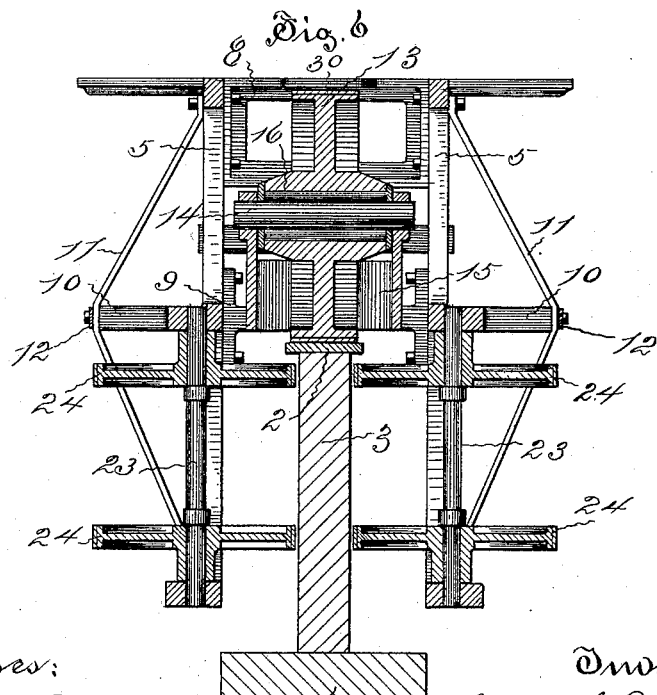
Witnesses:
Andrew Ferguson
E. J. Hyde
Inventor,
George J. Capewell, by
Harry P. Williams
atty.

UNITED STATES PATENT OFFICE.

GEORGE J. CAPEWELL, OF HARTFORD, CONNECTICUT.

CAR-TRUCK.

SPECIFICATION forming part of Letters Patent No. 609,781, dated August 30, 1898.

Application filed November 13, 1895. Renewed January 5, 1898. Serial No. 665,702. (No model.)

*To all whom it may concern:*

Be it known that I, GEORGE J. CAPEWELL, a citizen of the United States, residing at Hartford, in the county of Hartford and State of Connecticut, have invented certain new and useful Improvements in Car-Trucks, of which the following is a specification.

The invention relates more particularly to the class of trucks that are provided for railway-cars having one, two, or more wheels arranged tandem for traveling on a single rail and designed for high speeds; but it is readily applicable to trucks having wheels arranged in pairs on an axle, as usual, for traveling on two rails.

The object of the invention is the production of a simple, cheap, and strong truck which will run on the track and carry its load with a minimum amount of friction and pound, so that it will require less power to draw a load supported by this truck than with prior trucks, thereby enabling higher speed to be made with a given amount of power. To this end the construction of the truck is such that a rail with a wide tread and a wheel with a wide flat periphery may be utilized, the wheel being so hung that the weight of the load is evenly and regularly distributed over the full width of the wheel, which always rests flatly against the top of the rail, allowing the use of a cushion or other elastic tire on the rim of the wheel, thus reducing the friction between the rim and the rail and adding to the comfort of the passengers when traveling at high speeds.

The invention resides in a truck having broad-rimmed traction or supporting wheels held by bearings in a yoke or frame that is elastically connected with the truck-frame proper, so that the wheels may yield when necessary and oscillate independently from the truck, and thus will run flatly with side guiding-wheels located below the supporting-wheels for retaining the supporting-wheels on the rail, as more particularly hereinafter described, and pointed out in the claims.

In the views the invention is shown as applied to a truck constructed with a pair of wide wheels arranged tandem, as for a high-speed bicycle-railway.

Figure 4:
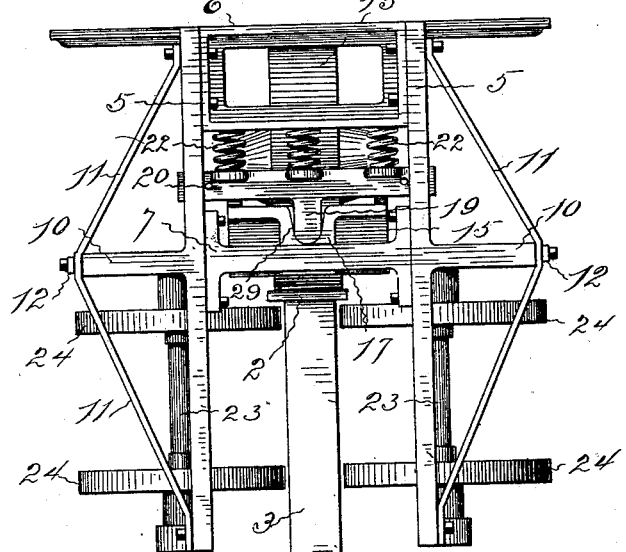

Figure 1 shows a side elevation of a coach provided with the improved trucks. Fig. 2 is an enlarged plan of one of the trucks. Fig. 3 is a side elevation of the truck. Fig. 4 is an end elevation of the same. Fig. 5 is a longitudinal section of one of the trucks. Fig. 6 is a transverse section of one of the trucks, taken through one of the supporting-wheels. Fig. 7 is a detail side elevation of one of the supporting-wheels and its holding-frame, and Fig. 8 is an edge view of the same.

In the views, 1 indicates a vestibule passenger-coach of ordinary construction provided with a pair of the improved trucks. These trucks are located beneath the coach near its ends and are held in position by king-bolts of ordinary construction, so that the trucks may oscillate independently of the body of the coach to permit the turning of curves and on to switches. The track illustrated is a single rail having a wide flat upper tread-surface 2, a deep web 3, and a base 4, which may be supported upon the top of any structure elevated to the desired level.

The form of truck shown in the drawings is preferably built of a pair of longitudinal side frames 5, that are joined at the ends by the upper cross-ties 6 and lower cross-ties 7 and at the middle by the upper cross-tie 8 and lower cross-tie 9, which are bolted or otherwise firmly secured to the longitudinal side frames. The king-bolt that connects the truck with the coach passes through a properly-formed opening in the middle cross-tie and suitably-located plates attached to the bottom of the coach-body, and the side frames depend downward below and on each side of the upper part of the rail. The side frames are preferably provided with outward-projecting arms 10, and truss-straps 11 are passed over the ends of these arms and connected to the upper and lower edges of the side frames, while longitudinal straps 12 tie together the ends of the arms and strengthen the structure without materially adding to its weight.

The supporting or traction wheels 13 are mounted on journals 14, supported by bearings formed in the walls of the wheel yokes or frames 15. These wheels may, if desired, be mounted on antifriction-bearings, as on the rollers 16, and the wheels may have wide flat peripheries formed of hard metal, or, being wide, they may be provided with cushion-tires or non-metallic bands around their peripheries, such as are indicated by the lines 30 in Figs. 5 and 6. The wheel-yokes 15 are preferably rectangular frames that hold the wheels in the center, and the ends of these have projecting parts 17, that extend loosely between projections 28 on the walls of the lower cross-ties 7, as shown in Fig. 2. In the form of wheel-yokes shown there are recesses 29 in the upper surfaces of the ends, and in these loosely rest the ends of hubs or studs 19, that project from bars 20, which extend across the truck-frame and have a free movement up and down with their ends guided and retained by the walls of the vertical openings 21. Any desired number of springs 22, of suitable form and strength, may be placed between the upper surfaces of these bars and the under surfaces of the cross-ties, so as to normally force the bars downward with a yielding pressure against the ends of the wheel yokes or frames, as shown in Figs. 4 and 5. The truck-frame is rigidly connected with the coach-body by a king-bolt or any other common means, and the springs transmit the weight of the coach and its load from the truck-frame to the bars that hold down the wheel-yokes, so that the wheel-yokes, with the traction-wheels, have a movement up and down independently of the truck-frame as the springs yield.

In bearings formed in the side frames of the truck are held one, two, or more vertical shafts 23, and mounted so as to lie substantially horizontal on these shafts are the guiding-wheels 24, any desired number of which may be placed on a shaft. These wheels are of such size and are so located that their peripheries almost come into contact with the opposite surfaces of the side walls of the web 3 of the track when the truck is in a vertical position. The peripheries of these wheels may be provided with cushion-tires, if desired.

When the truck above described is connected with a coach-body by a king-bolt, the truck of course has an oscillation independently of the coach to permit of the rounding of curves and the turning upon a switch, and when running the horizontal guiding-wheels keep the truck upright and retain the flat traction-wheels on the track, while adding but little friction, so that they do not appreciably interfere with the easy running of the truck when traveling at high speeds. If the tread of the track is made wider than the web of the track, of course these guiding-wheels also prevent the truck from rising up and jumping off the track, for the peripheries will come in contact with the edges of the wider tread.

With a truck formed in this manner traction or supporting wheels having wide peripheries can be utilized, and such wheels can be provided with cushion-tires, if desired, for the treads of the wheels are of sufficient area to allow of the use of softer material than is common without undue wear, as the wheel-bearings have an independent oscillation sidewise or transversely of the truck and also endwise or longitudinally of the truck, and the wheels will always remain with their faces flat on the tread of the track. If the coach tends to tip sidewise or the track is tilted over, so that its upper surface is not level, then the wheel-yokes will oscillate from side to side independently of the truck proper until the peripheries of the wheels will lie flat on the track, for the yokes will rock sidewise for a certain distance under the ends of the hubs projecting from the holding-down bars that extend transversely of the truck-frame, and the springs will yield accordingly. If the track is uneven or the coach is loaded more heavily at one end, the springs at that end of course compensate for the unequal loading.

A brake-cylinder 25 of ordinary construction may be secured to the truck-frame or near each end of the coach, and the piston-rod of the cylinder may be connected with a brake-shoe 26, fastened so that when desired the piston may be moved and the brake-shoe forced down toward the track with great pressure, the cylinder connections being those of the common form of brake in ordinary use. A sand-tube 27 may also be arranged adjacent to the brake-shoe, so as to permit the sanding of the track when desired for braking purposes.

The transversely and longitudinally oscillating wheel yokes or frames that directly support the wheels take all of the vibration, jar, and pound, so that the whole truck will ride easily, and as each yoke is supported independently of the other there will be but little pound as the wheels pass over an irregularity.

A truck constructed in this manner permits the use of wheels with wide faces, and the wheels having wide faces permit the truck to be run upon a single rail. A single rail with a wide tread and tandem wheels with a wide tread and side guiding-wheels permit the employment of cushion-tires, which relieve the vibration and jar without danger of causing the truck to jump the track when the coach is running at high speed.

This construction of truck also permits the use, if desired, of a timber track, which can be laid down unevenly over a rough country, for with the wide-faced wheels the load is distributed over a considerable surface, and these wide-faced wheels will lie flatly on the tread of the track and can be run at considerable speed without great jar to the body of the car.

This truck thus constructed in this manner is very simple, cheap, strong, and light in weight. High speeds can be maintained with coaches provided with these trucks without danger of their jumping the track and without uncomfortably affecting the passengers or jarring the load, for the friction of the parts that retain the truck on the track is reduced to a minimum, and the pound is limited to the individual supporting-wheels.

I claim as my invention—

1. In combination in a car-truck, a centrally-located wide-tread traction-wheel, a wheel-frame supported by the journal of the traction-wheel, a truck-frame adapted to be pivotally connected with a car-body, and yielding supporting connections between the wheel-frame and the truck-frame whereby the wheel-frame may be permitted an oscillation from side to side independently of the truck-frame to enable the wheel-tread to run flat upon the traction-rail without tipping the truck-frame, substantially as specified.

2. In combination in a car-truck, a centrally-arranged wide-tread traction-wheel, a wheel-frame supported by the journal of the traction-wheel, a truck-frame adapted to be pivotally connected with a car-body, and yielding supporting connections between the wheel-frame and the truck-frame whereby the wheel-frame may be permitted an oscillation from end to end independently of the truck-frame to enable the wheel to run over slight elevations or depressions without tipping the truck-frame, substantially as specified.

3. In combination in a car-truck, a centrally-arranged wide-tread traction-wheel, a wheel-frame supported by the journal of the traction-wheel, a truck-frame adapted to be pivotally connected with a car-body, and yielding supporting connections between the wheel-frame and the truck-frame whereby the wheel-frame may be permitted an oscillation from side to side transversely independent of the truck-frame and from end to end longitudinally independent of the truck-frame, substantially as specified.

4. In combination in a car-truck, a centrally-arranged wide-tread traction-wheel, a wheel-frame supported by the journal of the traction-wheel, a truck-frame adapted to be pivotally connected with a car-body, yielding supporting connections between the wheel-frame and the truck-frame whereby the wheel-frame may be permitted an oscillation from side to side independently of the truck-frame, and horizontally-arranged side guiding-wheels, substantially as specified.

5. In combination in a car-truck, a centrally-arranged wide-tread traction-wheel having a tire of cushioning material, a wheel-frame supported by the journal of the traction-wheel, a truck-frame adapted to be pivotally connected with a car-body, and yielding supporting connections between the wheel-frame and the truck-frame whereby the wheel-frame may be permitted an oscillation from side to side independently of the truck-frame, substantially as specified.

6. In combination in a car-truck, a centrally-arranged wide-tread traction-wheel having a tire of cushioning material, a wheel-frame supported by the journal of the traction-wheel, a truck-frame adapted to be pivotally connected with a car-body, yielding supporting connections between the wheel-frame and the truck-frame whereby the wheel-frame may be permitted an oscillation from side to side transversely independent of the truck-frame and from end to end longitudinally independent of the truck-frame, and horizontally-arranged side guiding-wheels having tires of cushioning material, substantially as specified.

7. In combination in a car-truck, a pair of traction-wheels arranged centrally of the truck one behind the other, an independent wheel-frame supported by the journal of each traction-wheel, a truck-frame adapted to be pivotally connected with a car-body, and yielding connections between the truck-frame and the wheel-frames so that the wheel-frames may be permitted transverse oscillation independently of each other and of the truck-frame, substantially as specified.

8. In combination in a car-truck, a pair of traction-wheels arranged centrally of the truck one behind the other, an independent wheel-frame supported by the journal of each traction-wheel, a truck-frame adapted to be pivotally connected with a car-body, yielding connections between the truck-frame and the wheel-frames so that the wheel-frames may be permitted a transverse oscillation independently of each other and of the truck-frame, and horizontally-arranged guiding-wheels located on each side of and below the traction-wheels, substantially as specified.

9. In combination in a car-truck, a pair of traction-wheels, a pair of wheel-frames supported by the journals of the traction-wheels, a truck-frame adapted to be pivotally connected with a car-body, yielding connections between the truck-frame and the wheel-frames so the wheel-frames may be permitted a transverse oscillation independently of each other and of the truck-frame, and a pair of horizontally-arranged side guiding-wheels located each side of and below each of the traction-wheels, substantially as specified.

10. In combination in a car-truck, a traction-wheel, a wheel-frame supported by the journal of the traction-wheel, a truck-frame adapted to be pivotally connected with a car-body, transversely-extending bars with hubs loosely resting against parts of the wheel-frame, and springs thrusting between the bars and parts of the truck-frame, substantially as specified.

GEORGE J. CAPEWELL.

Witnesses:
GEORGE J. CAPEWELL, Jr.,
H. R. WILLIAMS.